United States Patent
Ji et al.

(10) Patent No.: US 10,351,063 B1
(45) Date of Patent: Jul. 16, 2019

(54) CLOAKING DEVICES WITH HALF FRESNEL LENSES AND PLANE MIRRORS AND VEHICLES COMPRISING THE SAME

(71) Applicant: Toyota Motor Engineering & Manufacturing North America, Inc., Erlanger, KY (US)

(72) Inventors: Chengang Ji, Ann Arbor, MI (US); Kyu-Tae Lee, Ann Arbor, MI (US); Debasish Banerjee, Ann Arbor, MI (US)

(73) Assignee: TOYOTA MOTOR ENGINEERING & MANUFACTURING NORTH AMERICA, INC., Plano, TX (US)

( * ) Notice: Subject to any disclaimer, the term of this patent is extended or adjusted under 35 U.S.C. 154(b) by 29 days.

(21) Appl. No.: 15/863,353

(22) Filed: Jan. 5, 2018

(51) Int. Cl.
| | |
|---|---|
| *G02B 27/14* | (2006.01) |
| *G02B 3/08* | (2006.01) |
| *B60R 1/00* | (2006.01) |
| *B62D 25/04* | (2006.01) |
| *G02B 17/08* | (2006.01) |

(52) U.S. Cl.
CPC .............. *B60R 1/007* (2013.01); *B62D 25/04* (2013.01); *G02B 3/08* (2013.01); *G02B 17/08* (2013.01)

(58) Field of Classification Search
CPC ...... B62D 25/04; B60R 1/007; G02B 3/0043; G02B 3/08; G02B 17/08; G02B 27/123; G02B 2003/0093
See application file for complete search history.

(56) References Cited

U.S. PATENT DOCUMENTS

| | | |
|---|---|---|
| 9,405,118 B1 | 8/2016 | Lu |
| 9,557,547 B2 | 1/2017 | Choi et al. |
| 2003/0047666 A1 | 3/2003 | Alden |
| 2015/0183375 A1 | 7/2015 | Wu |
| 2017/0227781 A1 | 8/2017 | Banerjee et al. |

FOREIGN PATENT DOCUMENTS

| | | |
|---|---|---|
| CN | 105093506 A | 11/2015 |
| WO | 2017007526 A2 | 1/2017 |

OTHER PUBLICATIONS

"Physics demonstrations: cloaking device?", Apr. 25, 2013; URL: https://skullsinthestars.com/2013/04/25/physics-demonstrations-cloaking-device.
U.S. Appl. No. 15/677,341, filed Aug. 15, 2017; Inventors: Kyu-Tae Lee et al.

*Primary Examiner* — William Choi
(74) *Attorney, Agent, or Firm* — Dinsmore & Shohl LLP

(57) ABSTRACT

A cloaking device includes an object-side, an image-side and a cloaked region between the object side and image-side. An object-side half Fresnel lens, an image-side half Fresnel lens and a planar reflection boundary positioned between the object-side half Fresnel lens and the image-side half Fresnel lens are included. The object-side half Fresnel lens and the image-side half Fresnel lens each comprise an inward facing surface and an outward facing Fresnel surface. The planar reflection boundary comprises an inward facing mirror surface. Light from an object positioned on the object-side of the cloaking device and obscured by the cloaked region is redirected around the cloaked region by the object-side half Fresnel lens, planar reflection boundary and image-side half Fresnel lens to form an image of the object on the image-side of the cloaking device such that the light from the object appears to pass through the cloaked region.

20 Claims, 6 Drawing Sheets

CLOAKING DEVICES WITH HALF FRESNEL LENSES AND PLANE MIRRORS AND VEHICLES COMPRISING THE SAME

TECHNICAL FIELD

The present specification generally relates to apparatuses and methods for making an object appear transparent and, more specifically, to cloaking devices for pillars of vehicles and methods for making pillars of vehicles appear transparent.

BACKGROUND

Studies on cloaking devices that appear to make a pillar of a vehicle transparent have been published. Such studies disclose the use of metamaterials or the use of video cameras in combination with a display screen to allow an occupant of a vehicle to ostensibly "see" through the vehicle pillar, thereby reducing blind spots in the vehicle. However, metamaterials and video technology use complicated material designs and equipment.

Accordingly, a need exists for alternative devices that appear to make a pillar of a vehicle transparent.

SUMMARY

In one embodiment, a cloaking device includes an object-side, an image-side, a cloaked region between the object-side and the image-side, and a reference optical axis extending from the object-side to the image-side. An object-side half Fresnel lens and an image-side half Fresnel lens are included. The object-side half Fresnel lens and the image-side half Fresnel lens each comprise an inward facing surface, an outward facing Fresnel surface, a first end and a second end. The inward facing surface and the outward facing Fresnel surface extend between the first end and the second end. A planar reflection boundary positioned between the object-side half Fresnel lens and the image-side half Fresnel lens is included. The planar reflection boundary comprises an inward facing mirror surface oriented parallel to the reference optical axis. Light from an object positioned on the object-side of the cloaking device and obscured by the cloaked region is redirected around the cloaked region by the object-side half Fresnel lens, the planar reflection boundary and the image-side half Fresnel lens to form an image of the object on the image-side of the cloaking device such that the light from the object appears to pass through the cloaked region. In embodiments, the second ends of the object-side and image-side half Fresnel lenses are positioned proximal to the reference optical axis and the first ends of the object-side and image-side half Fresnel lenses are positioned distal to the reference optical axis. Also, the inward facing mirror surface of the planar reflection boundary may be positioned at a focal line of the object-side half Fresnel lens. The object-side half Fresnel lens is oriented to focus light from the object positioned on the object-side of the cloaking device onto the inward facing mirror surface of the planar reflection boundary and the inward facing mirror surface of the planar reflection boundary is oriented to reflect light from the object-side half Fresnel lens to the image-side half Fresnel lens. The image-side half Fresnel lens is oriented to focus light from the inward facing mirror surface of the planar reflection boundary and form the image of the object on the image-side of the cloaking device.

In another embodiment, a cloaking device assembly includes an object-side, an image-side, a cloaked region, a cloaked article positioned within the cloaked region, and a reference optical axis extending from the object-side to the image-side. A pair of object-side half Fresnel lenses and a pair of image-side half Fresnel lenses are included, and each of the pair of object-side half Fresnel lenses and each of the pair of image-side half Fresnel lenses comprise an inward facing surface and an outward facing Fresnel surface. One of the pair of object-side half Fresnel lenses is positioned on a first side of the reference optical axis and one of the pair of object-side half Fresnel lenses is positioned on a second side of the reference optical axis opposite the first side. Similarly, one of the pair of image-side half Fresnel lenses is positioned on the first side of the reference optical axis and one of the pair of image-side half Fresnel lenses is positioned on the second side of the reference optical axis. Each of the pair of object-side half Fresnel lenses and each of the pair of image-side half Fresnel lenses include a first end and a second end, and the inward facing surface and the outward facing Fresnel surface of each of the pair of object-side half Fresnel lenses and each of the pair of image-side half Fresnel lenses extend between the first end and the second end. The second end of each of the pair of object-side half Fresnel lenses and each of the pair of image-side half Fresnel lenses may be positioned proximal to the reference optical axis and each of the first ends may be positioned distal to the reference optical axis. In some embodiments, thicknesses of the first end of each of the pair of object-side half Fresnel lenses are equal. In other embodiments, thicknesses of the first end of each of the pair of object-side half Fresnel lenses are not equal. A pair of planar reflection boundaries is included and each of the pair of planar reflection boundaries includes an inward facing mirror surface oriented parallel to the reference optical axis. One of the pair of planar reflection boundaries is positioned between the object-side half Fresnel lens and the image-side half Fresnel lens positioned on the first side of the reference optical axis and another of the pair of planar reflection boundaries is positioned between the object-side half Fresnel lens and the image-side half Fresnel lens positioned on the second side of the reference optical axis. Light from an object positioned on the object-side of the cloaking device assembly and obscured by the cloaked region is redirected around the cloaked article by the pair of object-side half Fresnel lenses, the pair of planar reflection boundaries and the pair of image-side half Fresnel lenses to form an image of the object on the image-side of the cloaking device assembly such that the light from the object appears to pass through the cloaked article.

In another embodiment, a vehicle includes an A-pillar with a cloaking device positioned on the A-pillar. The cloaking device includes an object-side, an image-side, a cloaked region and a reference optical axis extending from the object-side to the image-side. The A-pillar is positioned within the cloaked region, the object-side is positioned on an exterior of the vehicle and the image-side is positioned within an interior of the vehicle. An object-side half Fresnel lens and an image-side half Fresnel lens are included. The object-side half Fresnel lens and the image-side half Fresnel lens each include an inward facing surface, an outward facing Fresnel surface, a first end and a second end. The inward facing surface and the outward facing Fresnel surface of the object-side half Fresnel lens and the image-side half Fresnel lens extend between the first end and the second end thereof. A planar reflection boundary positioned between the object-side half Fresnel lens and the image-side half Fresnel lens is included. The planar reflection boundary includes an inward facing mirror surface oriented parallel to the reference optical axis. Light from an object positioned on the exterior of the vehicle and obscured by the cloaked region is redirected around the A-pillar via propagation of the light through the object-side half Fresnel lens onto the planar reflection boundary, reflection of the light by the planar reflection boundary onto the image-side half Fresnel lens and propagation of the light through the image-side half Fresnel lens. The light forms an image of the object on the exterior of the vehicle within the interior of the vehicle such that the light from the object appears to pass through the A-pillar.

These and additional features provided by the embodiments described herein will be more fully understood in view of the following detailed description in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

According to one or more embodiments described herein, a cloaking device may generally comprise a pair of half Fresnel lenses and a planar mirror which direct incoming light around a cloaked region. The cloaking devices described herein may utilize cylindrical half Fresnel lenses in combination with a planar mirror to focus, reflect, diverge and re-focus light from an object. Cloaking devices may be used to cloak vehicle articles such as vehicle A-pillars, B-pillars, C-pillars, D-pillars, etc., and remove a "blind spot" caused by the vehicle article. A blind spot refers to a region of the vehicle where an occupant's view may be obstructed. The utilization of the half Fresnel lenses and planar mirror allows a driver to perceive an image which, if not for the cloaking device, would be obstructed by a pillar of the vehicle. Various embodiments of cloaking devices and methods for using the same will be described in further detail herein with specific reference to the appended drawings.

Figure 1:
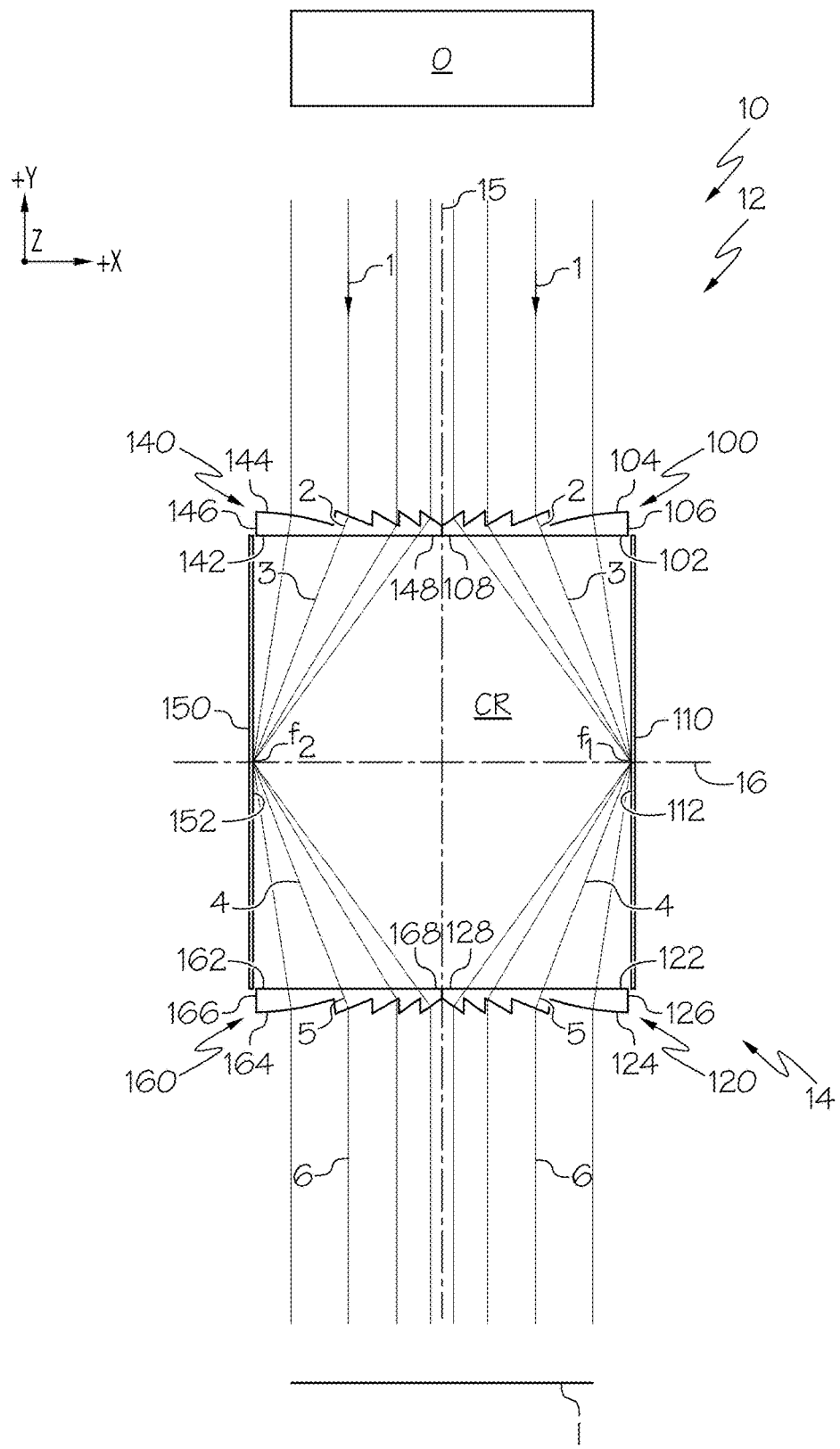
FIG. 1 schematically depicts a top view of a cloaking device according to one or more embodiments disclosed and described herein.

FIG. 1 generally depicts one embodiment of a cloaking device. The cloaking device includes a cloaked region that is at least partially bounded by two half Fresnel lenses and one planar reflection boundary positioned between the two half Fresnel lenses. As used herein, the term "half Fresnel lens" refers to a Fresnel lens with a reduced length along a direction perpendicular to an optical axis of the lens. The term "Fresnel lens" as used herein refers to a cylindrical Fresnel lens, i.e., a cylindrical lens with the convex surface formed from a plurality of concentric annular sections. The terms "boundaries" and "boundary" refer to a physical surface. One of the half Fresnel lenses may be an object-side half Fresnel lens and one of the half Fresnel lenses may be an image-side half Fresnel lens. The planar reflection boundary may be positioned between the object-side half Fresnel lens and the image-side half Fresnel lens. The object-side half Fresnel lens and the image-side half Fresnel lens each have an inward facing surface, an outward facing Fresnel surface, a first end and a second end. As used herein the term "inward facing surface" refers to a surface that faces towards or is proximal to the cloaked region, the term "outward facing surface" refers to a surface facing away or distal from the cloaked region, and the term "Fresnel surface" refers to a surface with a plurality of concentric grooves that provide individual refracting surfaces that can refract (bend) light rays to a common focal length. The object-side half Fresnel lens is oriented to focus incident light from an object positioned on an object-side of the cloaking device onto the planar reflection boundary. The planar reflection boundary is oriented to reflect and diverge the focused incident light from the object-side half Fresnel lens onto the inward facing surface of the image-side half Fresnel lens. The image-side half Fresnel lens is oriented to focus the diverging incident light from the planar reflection boundary and provide an image on the image-side of the cloaking device.

Still referring to FIG. 1, embodiments of a cloaking device include a cloaking assembly 10 with an object-side 12, an image-side 14, and four half Fresnel lenses 100, 120, 140, 160. A cloaked region CR is positioned between the half Fresnel lenses 100, 140 and half Fresnel lenses 120, 160. Each of the four half Fresnel lenses 100, 120, 140, 160 has a length along the X-axis, a thickness along the Y-axis and a height along the Z-axis of the coordinate axes shown in the figures. That is, the X-axis shown in the figures extends along a length of the four half Fresnel lenses 100, 120, 140, 160, the Y-axis shown in the figures extends along a thickness of the four half Fresnel lenses 100, 120, 140, 160, and the Z-axis shown in the figures extends along a height of the four half Fresnel lenses 100, 120, 140, 160. The two half Fresnel lenses 100, 140 may be positioned on the object-side 12 of the cloaking assembly 10 to face an object 'O' and may be referred to herein as object-side half Fresnel lenses 100, 140. The two half Fresnel lenses 120, 160 may be positioned on the image-side 14 of the cloaking assembly 10 to provide an image 'I' formed by the cloaking assembly 10 and may be referred to herein as image-side half Fresnel lenses 120, 160.

The half Fresnel lenses 100, 120, 140, 160 each have an inward facing surface 102, 122, 142, 162 and an outward facing Fresnel surface 104, 124, 144, 164, respectively. The half Fresnel lenses 100, 120, 140, 160 each have a first end 106, 126, 146, 166 and a second end 108, 128, 148, 168, respectively. The inward facing surfaces 102, 122, 142, 162 and outward facing Fresnel surfaces 104, 124, 144, 164 extend between the first ends 106, 126, 146 166 and second ends 108, 128, 148, 168, respectively.

Figure 2A:
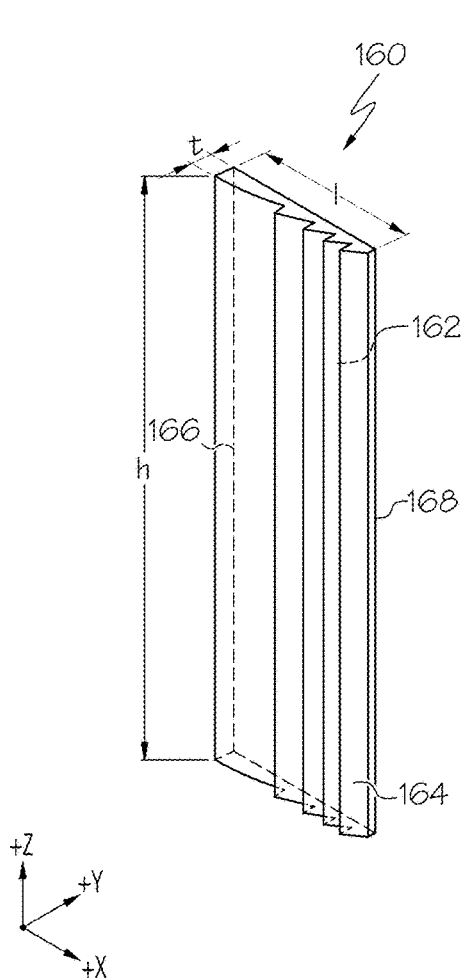
FIG. 2A schematically depicts a half cylindrical Fresnel lens for a cloaking device according to one or more embodiments disclosed and described herein.
Figure 2B:
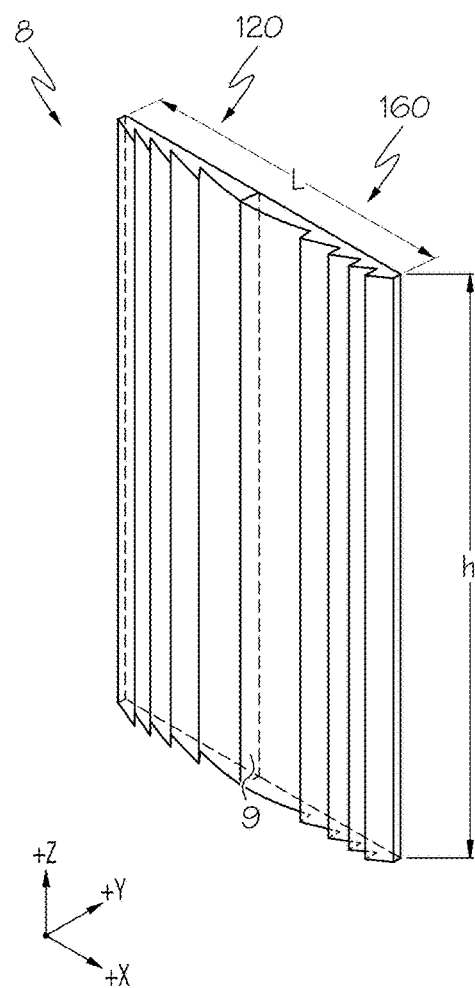
FIG. 2B schematically depicts a pair of half cylindrical Fresnel lenses formed from a cylindrical Fresnel lens for a cloaking device according to one or more embodiments disclosed and described herein.

An example of a half Fresnel lens 160 is depicted in FIG. 2A. Particularly, the half Fresnel lens 160 includes the inward facing surface 162 and the outward facing Fresnel surface 164. The inward facing surface 162 and the outward facing Fresnel surface 164 extend between the first end 166 and the second end 168. The inward facing surface 162 has a length 'l' along the X-direction and the first end 166 has a thickness 't' along the Y-direction. The half Fresnel lens 160 has a height 'h' and an optical axis (not shown) extending in the Z-direction. In embodiments, the half Fresnel lens 160 may be formed from a full cylindrical Fresnel lens as depicted in FIG. 2B. That is, a cylindrical Fresnel lens 8 with a length 'L' (X direction) depicted in FIG. 2B may be cut or sectioned along a plane 9 to form two half Fresnel lenses, e.g., the two half Fresnel lenses 120, 160 depicted in FIG. 2B. It should be understood that the half Fresnel lenses 100 and 140 may be formed in a similar manner, i.e., a pair of half Fresnel lenses formed from a single cylindrical Fresnel lens. It should also be understood that forming a pair of half Fresnel lenses from a single Fresnel lens may reduce the manufacturing costs of the cloaking devices described herein. Although FIG. 2B depicts sectioning of the cylindrical Fresnel lens 8 to form two half Fresnel lenses of equal size (i.e., the length 'l' of the two half Fresnel lenses 120, 160 is equal to 'L/2'), it should be understood that a "half Fresnel lens" as described herein may not be an exact half of a lens, i.e., the length 'l' of the half Fresnel lens may be less than or greater than "L/2" of the cylindrical Fresnel lens 8.

The half Fresnel lens 160, and other half Fresnel lenses disclosed herein, may be formed from any lens material suitable for focusing light rays. Non-limiting examples of suitable Fresnel lens materials include glass, acrylic polymers, polycarbonate polymers and rigid vinyl polymers. It should be understood that forming the half Fresnel lenses from polymer materials may provide a cloaking device assembly with reduced costs and weight compared to a cloaking device assembly with lenses formed from glass.

Referring back to FIG. 1, in embodiments, the second ends 108, 128, 148, 168 of the four half Fresnel lenses 100, 120, 140, 160 are positioned proximal or adjacent to a reference optical axis 15 extending from the object-side 12 to the image-side 14. In such embodiments, the first ends 106, 126, 146, 166 of the four half Fresnel lenses 100, 120, 140, 160 are positioned distal to or spaced apart from the reference optical axis 15. Although FIG. 1 depicts the second ends 108, 148 of the object-side half Fresnel lenses 100, 140, respectively, and the second ends 128, 168 of the image-side half Fresnel lenses 120, 160, respectively, positioned in contact with each other, it should be understood that the second ends 108, 148 and/or second ends 128, 168 may be spaced apart from each other along the X-axis such that an uncloaked region or gap (not shown) is present between the spaced apart second ends 108, 148 and/or spaced apart second ends 128, 168. In such embodiments, an image of the portion of the object O positioned above (+Y direction) the uncloaked region is not provided on the image side 14 of the cloaking assembly 10.

A planar reflection boundary 110 may be positioned between the object-side half Fresnel lens 100 and the image-side half Fresnel lens 120 on a first side (+X direction) of the reference optical axis 15 and a planar reflection boundary 150 may be positioned between the object-side half Fresnel lens 140 and the image-side half Fresnel lens 160 on a second side (−X direction) of the reference optical axis 15 opposite the first side. In embodiments, the planar reflection boundary 110 extends from the inward facing surface 102 of the object-side half Fresnel lens 100 to the inward facing surface 122 of the image-side half Fresnel lens 120, and the planar reflection boundary 150 extends from the inward facing surface 142 of the object-side half Fresnel lens 140 to the inward facing surface 162 of the image-side half Fresnel lens 160 as depicted in FIG. 1. In other embodiments, the planar reflection boundary 110 may not extend from the inward facing surface 102 of the object-side half Fresnel lens 100 to the inward facing surface 122 of the image-side half Fresnel lens 120, and/or the planar reflection boundary 150 may not extend from the inward facing surface 142 of the object-side half Fresnel lens 140 to the inward facing surface 162 of the image-side half Fresnel lens 160. In such embodiments, the planar reflection boundary 110 and/or the planar reflection boundary 150 may be positioned on a bisecting axis 16 that bisects and extends between the object-side 12 and the image-side 14. That is, the planar reflection boundary 110 may be spaced apart from the inward facing surface 102 of the object-side half Fresnel lens 100 and the inward facing surface 122 of the image-side half Fresnel lens 120, and/or the planar reflection boundary 150 may be spaced apart from the inward facing surface 142 of the object-side half Fresnel lens 140 and the inward facing surface 162 of the image-side half Fresnel lens 160. The planar reflection boundary 110 may include an inward facing mirror surface 112 and the planar reflection boundary 150 may include an inward facing mirror surface 152. The inward facing mirror surfaces 112, 152 may be oriented parallel to the reference optical axis 15 and can be made from omnidirectional photonic crystals or mirrors.

The planar reflection boundary 110 is positioned relative to the object-side half Fresnel lens 100 such that light from an object O (shown as arrow '1' in FIG. 1) incident on the cloaking assembly 10 on the first side (+X direction) of the reference optical axis 15 propagates through (shown as arrow '2' in FIG. 1) and is focused by the object-side half Fresnel lens 100 (shown as arrow '3' in FIG. 1) onto the inward facing mirror surface 112. In embodiments, light 3 is focused by the object-side half Fresnel lens 100 to a focal line $f_1$ extending in the Z-direction. In such embodiments, the inward facing mirror surface 112 may be positioned at the focal line $f_1$. It should be understood that the focal line $f_1$, and other focal lines described herein, are provided by the shape of the object-side half Fresnel lenses described herein.

For example, the focal line $f_1$ is due to or provided by the plurality of concentric grooves (not labeled) in the outward facing Fresnel surface 104 of the object-side half Fresnel lens 100. Light 3 is reflected by and diverges from the inward facing mirror surface 112 (shown as arrow '4' in FIG. 1). The image-side half Fresnel lens 120 is positioned relative to the planar reflection boundary 110 such that light 3 reflected by and diverging from the inward facing mirror surface 112 is incident on the inward facing surface 122. Light 4 propagates through and is focused by the image-side half Fresnel lens 120 (shown as arrow '5' in FIG. 1) and light 6 provides a portion of an Image 'I' on the first side (+X direction) of the reference optical axis 15 on the image-side 14 of the cloaking assembly 10.

Light 1 incident on the outward facing Fresnel surface 104 propagates through the object-side half Fresnel lens 100 as light 2 to the inward facing surface 102. Light 2 is generally focused as light 3 by the object-side half Fresnel lens 100 to the focal line $f_1$ on the inward facing mirror surface 112 of the planar reflection boundary 110 before being reflected and diverging as light 4 onto the inward facing surface 122 of the image-side half Fresnel lens 120. Light 5 propagates through the image-side half Fresnel lens 120 to the outward facing Fresnel surface 124. The image-side half Fresnel lens 120 focuses light 5 parallel to its original path, i.e., parallel to light 1 (shown as arrow '6' in FIG. 1), to form a first side portion (+X direction) of an image 'I' on the image-side 14 of the cloaking assembly 10. Accordingly, light 1 from the object O on the first side (+X direction) of the reference optical axis 15 propagates to the image-side to form the image I on the first side of the reference optical axis 15 via the optical path: Object—object-side half Fresnel lens 100—planar reflection boundary 110—image-side half Fresnel lens 120—Image. That is, light 1 from the object O on the first side (+X direction) of the reference optical axis 15 propagates via the optical path: object O—outward facing Fresnel surface 104 of the object-side half Fresnel lens 100—inward facing surface 102 of the object-side half Fresnel lens 100—inward facing mirror surface 112 of the planar reflection boundary 110—inward facing surface 122 of the image-side half Fresnel lens 120—outward facing Fresnel surface 124 of the image-side half Fresnel lens 120—image I.

The planar reflection boundary 150 is positioned relative to the object-side half Fresnel lens 140 such that light 1 from the object O incident on the cloaking assembly 10 on the second side (−X direction) of the reference optical axis 15 propagates through (light 2) and is focused by the object-side half Fresnel lens 140 as light 3 on the inward facing mirror surface 152. In embodiments, light 3 is focused by the object-side half Fresnel lens 140 to a focal line $f_2$ extending in the Z-direction. In such embodiments, the inward facing mirror surface 152 may be positioned at the focal line $f_2$. Light 3 is reflected by and diverges from the inward facing mirror surface 152 as light 4. The image-side half Fresnel lens 160 is positioned relative to the planar reflection boundary 150 such that light 3 reflected by and diverging from the inward facing mirror surface 152 as light 4 is incident on the inward facing surface 162. Light 4 propagates through (light 5) and is focused by the image-side half Fresnel lens 160 as light 6 to provide a portion of the Image 'I' on the second side of the reference optical axis 15 on the image-side 14 of the cloaking assembly 10.

Light 1 incident on the outward facing Fresnel surface 144 propagates through the object-side half Fresnel lens 140 as light 2 to the inward facing surface 142. Light 2 is generally focused as light 3 by the object-side half Fresnel lens 140 to the focal line $f_2$ on the inward facing mirror surface 152 of the planar reflection boundary 150 before being reflected and diverging as light 4 onto the inward facing surface 162 of the image-side half Fresnel lens 160. Light 5 propagates through the image-side half Fresnel lens 160 to the outward facing Fresnel surface 164. The image-side half Fresnel lens 160 focuses light 5 parallel to its original path as light 6 to form a second side portion (−X direction) of the image 'I' on the image-side 14 of the cloaking assembly 10. Accordingly, light 1 from the object O on the second side (−X direction) of the reference optical axis 15 propagates to the image-side to form the image I on the second side of the reference optical axis 15 via the optical path: Object—object-side half Fresnel lens 140—planar reflection boundary 150—image-side half Fresnel lens 160—Image. That is, light 1 from the object O on the second side (−X direction) of the reference optical axis 15 propagates via the optical path: object O—outward facing Fresnel surface 144 of the object-side half Fresnel lens 140—inward facing surface 142 of the object-side half Fresnel lens 140—inward facing mirror surface 152 of the planar reflection boundary 150—inward facing surface 162 of the image-side half Fresnel lens 160—outward facing Fresnel surface 164 of the image-side half Fresnel lens 160—image I.

In combination, i.e., light 1 on the first side (+X direction) and second side (−X direction) of the reference optical axis 15 from the object O on the object-side 12 of the cloaking assembly 10 propagates to the image-side 14 via the optical path: Object—object-side half Fresnel lenses 100, 140—planar reflection boundaries 110, 150—image-side half Fresnel lenses 120, 160—Image. That is, light 1 from the object O propagates via the optical path: object O—outward facing Fresnel surfaces 104, 144 of the object-side half Fresnel lenses 100, 140, respectively—inward facing surfaces 102, 142 of the object-side half Fresnel lenses 100, 140, respectively—inward facing mirror surfaces 112, 152 of the planar reflection boundaries 110, 150, respectively—inward facing surfaces 122, 162 of the image-side half Fresnel lenses 120, 160, respectively—outward facing Fresnel surfaces 124, 164 of the image-side half Fresnel lenses 120, 160, respectively—image I.

Figure 3:
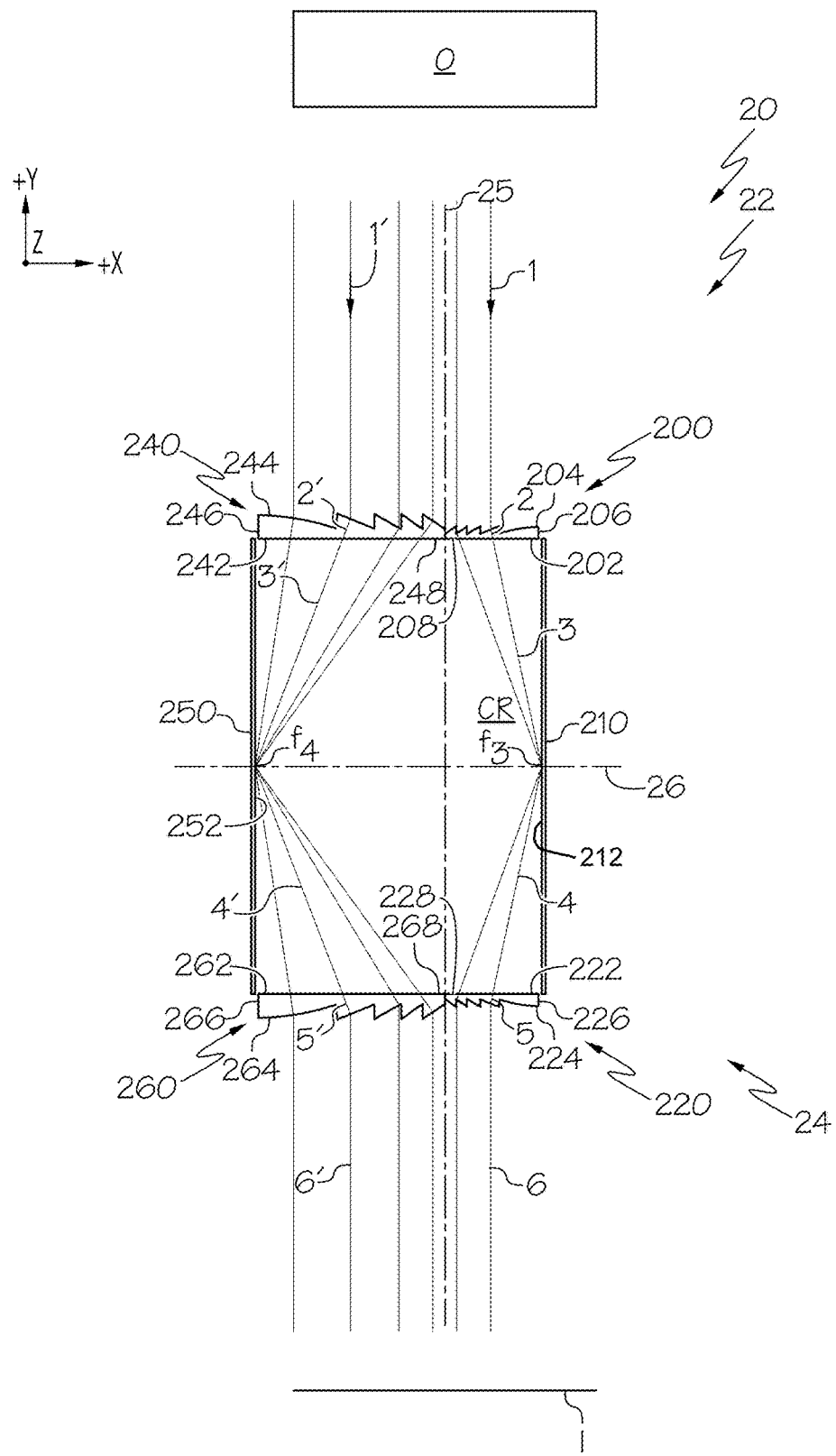
FIG. 3 schematically depicts a top view of a cloaking device according to one or more embodiments disclosed and described herein.

Although FIG. 1 depicts the four half Fresnel lenses 100, 120, 140, 160 being of the same size, i.e., the lengths of the inward facing surfaces 102, 122, 142, 162 are equal and the thicknesses of the first ends 106, 126, 146, 166 are equal, in some embodiments, the four half Fresnel lenses 100, 120, 140, 160 are not the same size. Particularly, FIG. 3 depicts a cloaking assembly 20 with half Fresnel lenses of different sizes. The cloaking assembly 20 includes an object-side 22, an image-side 24, and four half Fresnel lenses 200, 220, 240, 260. The two half Fresnel lenses 200, 220 on the first side (+X direction) of a reference optical axis 25 are smaller than the two half Fresnel lenses 240, 260 on the second side (−X direction) of the reference optical axis 25 as discussed in greater detail below. A cloaked region CR is positioned between the half Fresnel lenses 200, 240 and the half Fresnel lenses 220, 260. Each of the four half Fresnel lenses 200, 220, 240, 260 has a length along the X-axis, a thickness along the Y-axis and a height along the Z-axis shown in the figures. The two half Fresnel lenses 200, 240 may be positioned on the object-side 22 of the cloaking assembly 20 to face an object 'O' and may be referred to herein as object-side half Fresnel lenses 200, 240. The two half Fresnel lenses 220, 260 may be positioned on the image-side 24 of the cloaking assembly 20 to provide an image 'I' formed by the cloaking assembly 20 and may be referred to herein as image-side half Fresnel lenses 220, 260.

The half Fresnel lenses 200, 220, 240, 260 each have an inward facing surface 202, 222, 242, 262 and an outward facing Fresnel surface 204, 224, 244, 264, respectively. Also, the half Fresnel lenses 200, 220, 240, 260 each have a first end 206, 226, 246, 266 and a second end 208, 228, 248, 268, respectively. The inward facing surfaces 202, 222, 242, 262 and the outward facing Fresnel surfaces 204, 224, 244, 264 extend between the first ends 206, 226, 246 266 and the second ends 208, 228, 248, 268, respectively.

As depicted in FIG. 3, the inward facing surface 202 of the object-side half Fresnel lens 200 may have a length (X-direction) that is less than a length of the inward facing surface 242 of the object-side half Fresnel lens 240 and the inward facing surface 222 of the image-side half Fresnel lens 220 may have a length that is less than a length of the inward facing surface 262 of the image-side half Fresnel lens 260. In the alternative, or in addition to, the first end 206 of the object-side half Fresnel lens 200 may have a thickness (Y direction) that is less than a thickness of the first end 246 of the object-side half Fresnel lens 240 and the first end 226 of the image-side half Fresnel lens 220 may have a thickness that is less than a thickness of the first end 266 of the image-side half Fresnel lens 260. In embodiments, the half Fresnel lenses 200, 220, 240, 260 are half Fresnel lenses 200, 220, 240, 260.

In embodiments, the second ends 208, 228, 248, 268 are positioned proximal or adjacent to a reference optical axis 25 extending from the object-side 22 to the image-side 24. In such embodiments, the first ends 206, 226, 246, 266 are positioned distal to or spaced apart from the reference optical axis 25. Although FIG. 3 depicts the second ends 208, 248 of the object-side half Fresnel lens 200, 240, respectively, and the second ends 228, 268 of the image-side half Fresnel lenses 220, 260, respectively, positioned in contact with each other, it should be understood that the second ends 208, 248 and/or second ends 228, 268 may be spaced apart from each other along the X-axis such that an uncloaked region or gap (not shown) is present between the spaced apart second ends 208, 248 and/or spaced apart second ends 228, 268. In such embodiments, an image of the portion of the object O positioned above (+Y direction) the uncloaked region is not provided on the image side 24 of the cloaking assembly 20.

A planar reflection boundary 210 may be positioned between the object-side half Fresnel lens 200 and the image-side half Fresnel lens 220 on a first side (+X direction) of the reference optical axis 25 and a planar reflection boundary 250 may be positioned between the object-side half Fresnel lens 240 and the image-side half Fresnel lens 260 on a second side (−X direction) of the reference optical axis 25 opposite the first side. In embodiments, the planar reflection boundary 210 extends from the inward facing surface 202 of the object-side half Fresnel lens 200 to the inward facing surface 222 of the image-side half Fresnel lens 220, and the planar reflection boundary 250 extends from the inward facing surface 242 of the object-side half Fresnel lens 240 to the inward facing surface 262 of the image-side half Fresnel lens 260 as depicted in FIG. 3. In other embodiments, the planar reflection boundary 210 may not extend from the inward facing surface 202 of the object-side half Fresnel lens 200 to the inward facing surface 222 of the image-side half Fresnel lens 220, and the planar reflection boundary 250 may not extend from the inward facing surface 242 of the object-side half Fresnel lens 240 to the inward facing surface 262 of the image-side half Fresnel lens 260. In such embodiments, the planar reflection boundary 210 and/or the planar reflection boundary 250 may be positioned on a bisecting axis 26 that bisects and extends between the object-side 22 and the image-side 24. That is, the planar reflection boundary 210 may be spaced apart from the inward facing surface 202 of the object-side half Fresnel lens 200 and/or the inward facing surface 222 of the image-side half Fresnel lens 220, and/or the planar reflection boundary 250 may be spaced apart from the inward facing surface 242 of the object-side half Fresnel lens 240 and/or the inward facing surface 262 of the image-side half Fresnel lens 260. The planar reflection boundary 210 may include an inward facing mirror surface 212 and the planar reflection boundary 250 may include an inward facing mirror surface 252. The inward facing mirror surfaces 212, 252 may be oriented parallel to the reference optical axis 25 and can be made from omnidirectional photonic crystals or mirrors.

The planar reflection boundary 210 is positioned relative to the object-side half Fresnel lens 200 such that light from an object O (shown as arrow '1' in FIG. 3) incident on the cloaking assembly 20 on the first side (+X direction) of the reference optical axis 25 propagates through (shown as arrow '2' in FIG. 3) and is focused by the object-side half Fresnel lens 200 (shown as arrow '3' in FIG. 3) onto the inward facing mirror surface 212. In embodiments, light 3 is focused by the object-side half Fresnel lens 200 to a focal line $f_3$ extending in the Z-direction. In such embodiments, the inward facing mirror surface 212 may be positioned at the focal line $f_3$. Light 3 is reflected by and diverges from the inward facing mirror surface 212 (shown as arrow '4' in FIG. 3). The image-side half Fresnel lens 220 is positioned relative to the planar reflection boundary 210 such that light 3 reflected by and diverging from the inward facing mirror surface 212 is incident on the inward facing surface 222. Light 4 propagates through (shown as arrow '5' in FIG. 3) and is focused by the image-side half Fresnel lens 220 (shown as arrow '6' in FIG. 3) to provide a portion of an Image 'I' on the first side of the reference optical axis 25 on the image-side 24 of the cloaking assembly 20.

Light 1 incident on the outward facing Fresnel surface 204 propagates through the object-side half Fresnel lens 200 as light 2 to the inward facing surface 202. Light 2 is generally focused as light 3 by the object-side half Fresnel lens 200 to the focal line $f_3$ on the inward facing mirror surface 212 of the planar reflection boundary 210 before being reflected and diverging as light 4 onto the inward facing surface 222 of the image-side half Fresnel lens 220. Light 5 propagates through the image-side half Fresnel lens 220 to the outward facing Fresnel surface 224. The image-side half Fresnel lens 220 focuses light 5 parallel to its original path, i.e., parallel to light 1 (shown as arrow '6' in FIG. 3), to form a first side portion (+X direction) of an image 'I' on the image-side 24 of the cloaking assembly 20. Accordingly, light 1 from the object O on the first side (+X direction) of the reference optical axis 25 propagates to the image-side to form the image I on the first side of the reference optical axis 25 via the optical path: Object—object-side half Fresnel lens 200—planar reflection boundary 210—image-side half Fresnel lens 220—Image. That is, light 1 from the object O on the first side (+X direction) of the reference optical axis 25 propagates via the optical path: object O—outward facing Fresnel surface 204 of the object-side half Fresnel lens 200—inward facing surface 202 of the object-side half Fresnel lens 200—inward facing mirror surface 212 of the planar reflection boundary 210—inward facing surface 222 of the image-side half Fresnel lens 220—outward facing Fresnel surface 224 of the image-side half Fresnel lens 220—image I.

The planar reflection boundary 250 is positioned relative to the object-side half Fresnel lens 240 such that light 1' from the object O incident on the cloaking assembly 20 on the second side (−X direction) of the reference optical axis 25 propagates through (light 2') and is focused by the object-side half Fresnel lens 240 as light 3' onto the inward facing mirror surface 252. In embodiments, light 3' is focused by the object-side half Fresnel lens 240 to a focal line $f_4$ extending in the Z-direction. In such embodiments, the inward facing mirror surface 252 may be positioned at the focal line $f_4$. Light 3' is reflected by and diverges from the inward facing mirror surface 252 as light 4'. The image-side half Fresnel lens 260 is positioned relative to the planar reflection boundary 250 such that light 3' reflected by and diverging from the inward facing mirror surface 252 as light 4' is incident on the inward facing surface 262. Light 4' propagates through (light 5') and is focused by the image-side half Fresnel lens 260 as light 6' to provide a portion of the Image 'I' on the second side of the reference optical axis 25 on the image-side 24 of the cloaking assembly 20.

Light 1' incident on the outward facing Fresnel surface 244 propagates through the object-side half Fresnel lens 240 as light 2' to the inward facing surface 242. Light 2' is generally focused as light 3' by the object-side half Fresnel lens 240 to the focal line $f_4$ on the inward facing mirror surface 252 of the planar reflection boundary 250 before being reflected as diverging light 4' onto the inward facing surface 262 of the image-side half Fresnel lens 260. Light 5' propagates through the image-side half Fresnel lens 260 to the outward facing Fresnel surface 264. The image-side half Fresnel lens 260 focuses light 5' parallel to its original path as light 6' to form a second side portion (−X direction) of the image 'I' on the image-side 24 of the cloaking assembly 20. Accordingly, light 1' from the object O on the second side (−X direction) of the reference optical axis 25 propagates to the image-side to form the image I on the second side of the reference optical axis 25 via the optical path: Object—object-side half Fresnel lens 240—planar reflection boundary 250—image-side half Fresnel lens 260—Image. That is, light 1' from the object O on the second side (−X direction) of the reference optical axis 25 propagates via the optical path: object O—outward facing Fresnel surface 244 of the object-side half Fresnel lens 240—inward facing surface 242 of the object-side half Fresnel lens 240—inward facing mirror surface 252 of the planar reflection boundary 250—inward facing surface 262 of the image-side half Fresnel lens 260—outward facing Fresnel surface 264 of the image-side half Fresnel lens 260—image I.

In combination, i.e., light 1 on the first side (+X direction) and second side (−X direction) of the reference optical axis 25 from the object O on the object-side 22 of the cloaking assembly 20 propagates to the image-side 24 via the optical path: Object—object-side half Fresnel lenses 200, 240—planar reflection boundaries 210, 250—image-side half Fresnel lenses 220, 260—Image. That is, light 1 from the object O propagates via the optical path: object O—outward facing Fresnel surfaces 204, 244 of the object-side half Fresnel lenses 200, 240, respectively—inward facing surfaces 202, 242 of the object-side half Fresnel lenses 200, 240, respectively—inward facing mirror surfaces 212, 252 of the planar reflection boundaries 210, 250, respectively—inward facing surfaces 222, 262 of the image-side half Fresnel lenses 220, 260, respectively—outward facing Fresnel surfaces 224, 264 of the image-side half Fresnel lenses 220, 260, respectively—image I.

Figure 4:
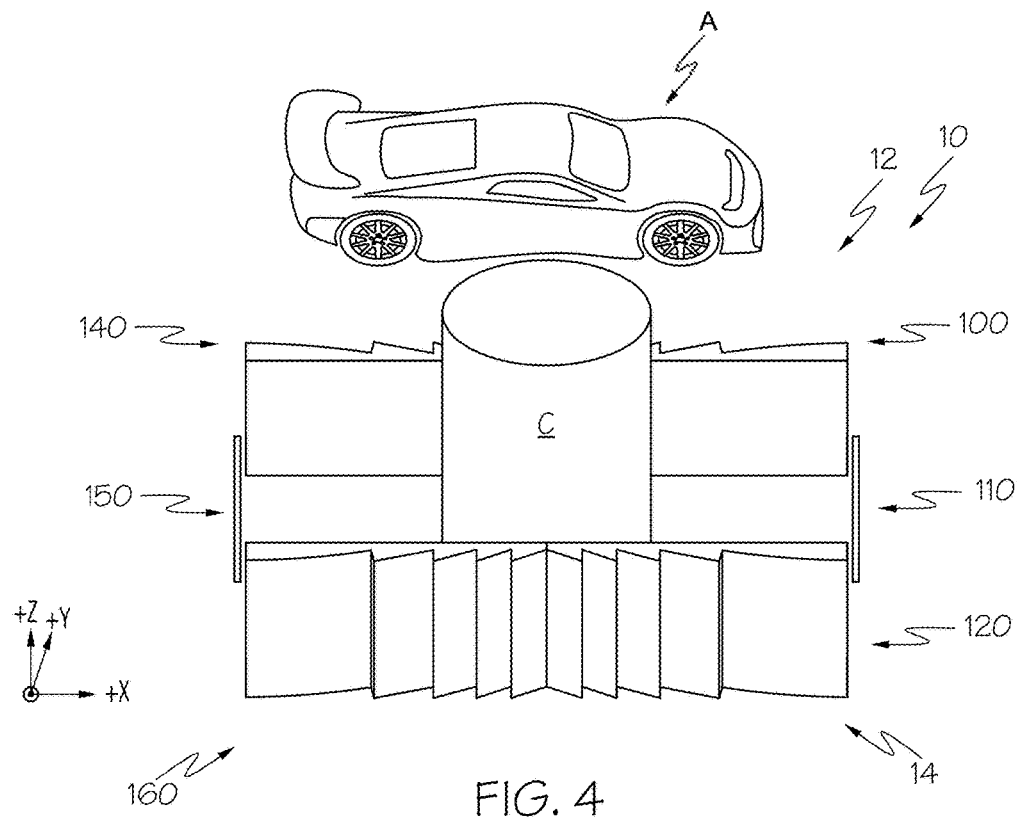
FIG. 4 schematically depicts a top perspective view of the cloaking device of FIG. 1 with a first object on one side of the cloaking device and a second object within the cloaked region of the cloaking device according to one or more embodiments disclosed and described herein.
Figure 5:
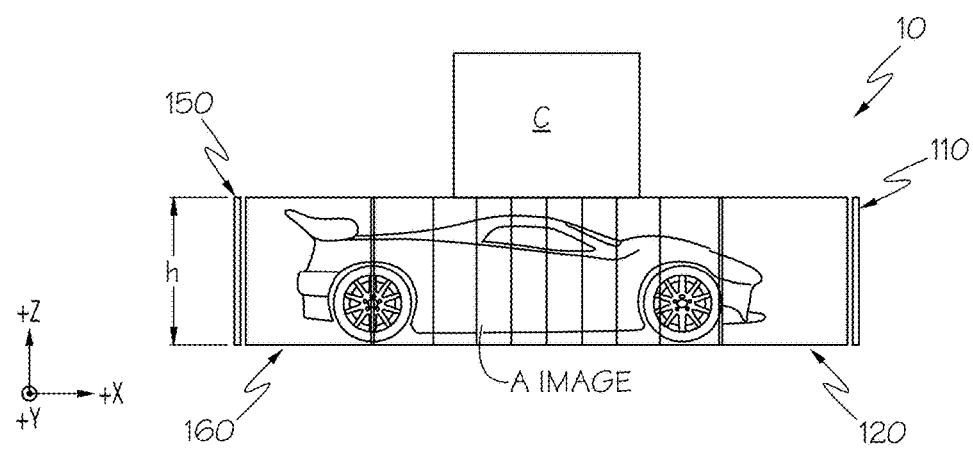
FIG. 5 schematically depicts a side view of the cloaking device of FIG. 1 with the first object on one side of the cloaking device and the second object within the cloaked region of the cloaking device.

Referring now to FIGS. 1, 4 and 5, a top perspective view and a side view of a cloaking device according to embodiments as discussed with respect to FIG. 1 are shown in FIGS. 4 and 5, respectively. Specifically, FIG. 4 is a top perspective view of an article in the form of a column 'C' within the cloaked region CR of the cloaking assembly 10 and an automobile 'A' located behind the column C on the object-side 12 of the cloaking assembly 10 in the +Y direction. The column C has a height dimension in the Z direction (increasing height in the +Z direction) greater than the height h of the cloaking device (FIG. 5). FIG. 5 is a side view from the +Y direction of the cloaking assembly 10 shown in FIG. 1 and shows the portion of the column C that is within the cloaked region is not visible and the automobile A located behind the column C in the +Y direction is visible to an observer viewing the cloaking assembly 10 in the +Y direction. Accordingly, the column C positioned within the cloaked region is not visible to an observer viewing the image-side 14 of the cloaking assembly 10 and an image of the automobile A is visible to the observer viewing the image-side 14. Although column C in FIGS. 4 and 5 is separate from the inward facing surfaces (e.g., inward facing surfaces 102, 122, 142, 162 of cloaking assembly 10), i.e., column C is a separate object from the cloaking assembly 10, it should be appreciated that column C may be structurally part of cloaking assembly 10 and have an outer surface that provides or is equivalent to the inward facing surfaces of the half Fresnel lenses.

Figure 6:
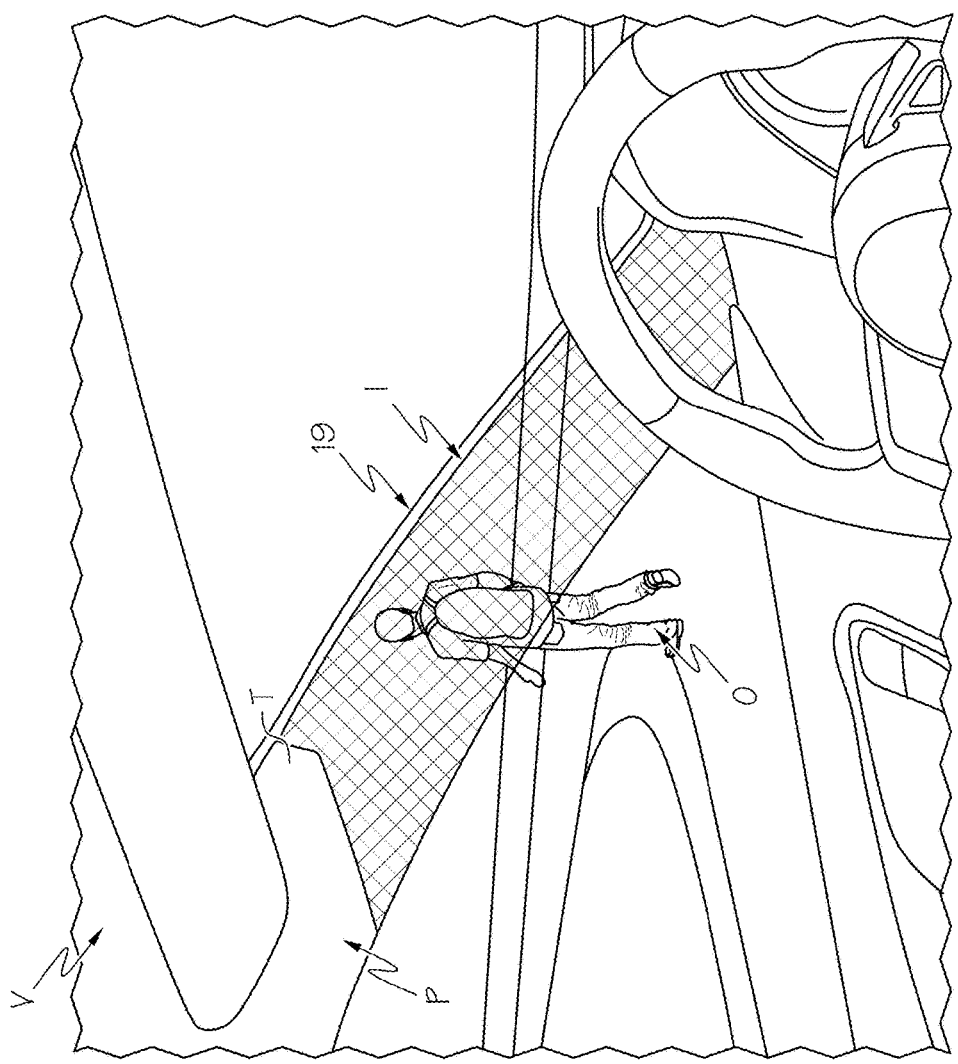
FIG. 6 schematically depicts a cloaking device cloaking a vehicle A-pillar of a vehicle according to one or more embodiments described and illustrated herein.

Referring to FIG. 6, embodiments of an A-pillar of a vehicle being cloaked by a cloaking device are shown. Particularly, FIG. 6 shows a cloaking device 19 as described herein cloaking a portion of an A-pillar P of a vehicle V. A portion of the A-pillar P is positioned within a cloaked region (not shown) of the cloaking device 19 and a portion of the A-pillar P extends beyond the cloaking device and is covered with trim T. Illustrated outside of the vehicle V on the object-side of the cloaking device 19 is a target object 'O' in the form of pedestrian. A portion of the pedestrian O is visible through a side window of the vehicle V and a portion of the pedestrian is visible "through" the A-pillar P cloaked by the cloaking device 19. The cloaking device 19 redirects light reflected from the pedestrian O around the A-pillar P positioned within the cloaked region of the cloaking device 19 and forms an image I of the pedestrian O in the interior of the vehicle on the image-side of the cloaking device 19 that is visible to an occupant of the vehicle V looking towards the pedestrian O. Accordingly, light from the pedestrian O appears to pass through the A-pillar P and a blind spot typically created by the A-pillar P is not as present as when the portion of the A-pillar P is not positioned within the cloaked region of the cloaking device 19. In embodiments, the A-pillar P itself serves as the cloaked region, i.e. the A-pillar P has an outer surface with one or more inward facing surfaces that assist in redirecting light from the pedestrian) around the A-pillar P. It should be appreciated that cloaking of the A-pillar P with the cloaking device 19 and bypassing the blind spot produced by the A-pillar P is performed without the use of metamaterials, video images, cameras, sophisticated electronics, etc.

EXAMPLES

Figure 7A:
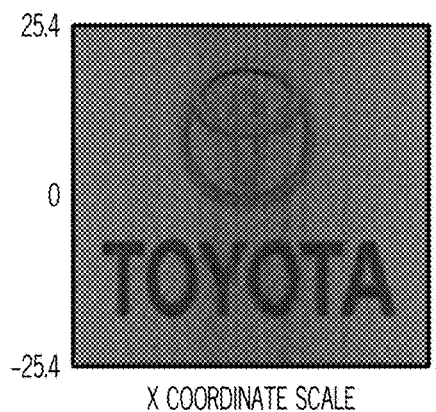
FIG. 7A depicts a computer simulated cloaking image for a cloaking assembly according to the embodiments of FIG. 1 with a 0° misalignment between a reference optical axis and a viewing angle of the cloaking assembly.
Figure 7B:
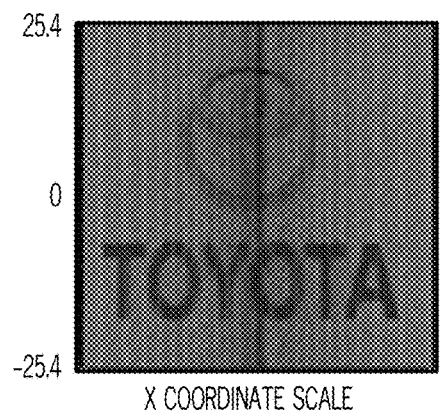
FIG. 7B depicts a computer simulated cloaking image for a cloaking assembly according to the embodiments of FIG. 1 with a 1° misalignment between a reference optical axis and a viewing angle of the cloaking assembly.
Figure 7C:
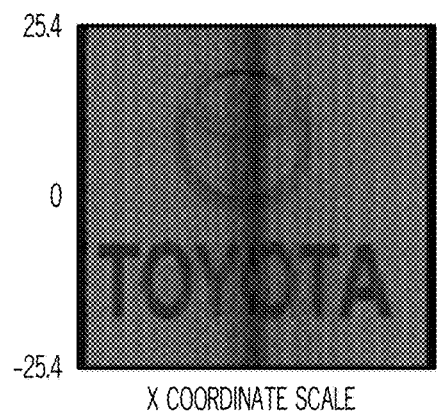
FIG. 7C depicts a computer simulated cloaking image for a cloaking assembly according to the embodiments of FIG. 1 with a 2° misalignment between a reference optical axis and a viewing angle of the cloaking assembly.
Figure 7D:
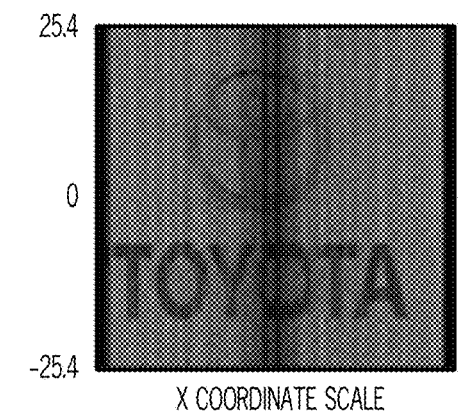
FIG. 7D depicts a computer simulated cloaking image for a cloaking assembly according to the embodiments of FIG. 1 with a 3° misalignment between a reference optical axis and a viewing angle of the cloaking assembly.
Figure 7E:
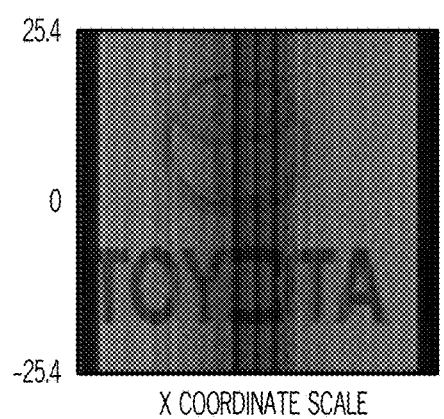
FIG. 7E depicts a computer simulated cloaking image for a cloaking assembly according to the embodiments of FIG. 1 with a 5° misalignment between a reference optical axis and a viewing angle of the cloaking assembly.

Referring now to FIGS. 7A-7E, images of an object in the form of an emblem positioned on the object-side 12 of the cloaking assembly 10 and as viewed from the image-side 14 simulated using a commercial software program (Zemax OpticStudio) are depicted. The object-side half Fresnel lenses 100, 140 and image-side half Fresnel lenses 120, 160 are half Fresnel lenses formed from an acrylic polymer. The object-side half Fresnel lenses 100, 140 and image-side half Fresnel lenses 120, 160 have a focal length of 31 mm and a thickness t of 1.5 mm. The aspect ratios for the entire device area and the hidden region are 0.77 and 0.81, respectively, with a cloaking ratio (i.e., hidden area/total device area) of about 48%. FIG. 7A depicts an image of the object with no misalignment (0°) between the reference optical axis 15 and a viewing angle of the cloaking assembly 10 from the +Y direction. That is, as used herein, the term misalignment refers to an angle defined by the reference optical axis of a cloaking assembly and a line of sight of an observer viewing the cloaking assembly from the image-side as depicted by the +Y direction in the figures (also referred to herein as a "viewing angle"). FIG. 7B depicts an image of the object with a 1° misalignment between the reference optical axis 15 and a viewing angle of the cloaking assembly 10. FIG. 7C depicts an image of the object with a 2° misalignment between the reference optical axis 15 and a viewing angle of the cloaking assembly 10. FIG. 7D depicts an image of the object with a 3° misalignment between the reference optical axis 15 and a viewing angle of the cloaking assembly 10. FIG. 7E depicts an image of the object with a 5° misalignment between the reference optical axis 15 and a viewing angle of the cloaking assembly 10. As shown by the images in FIGS. 7A-7E, an image of an object on the object-side 12 of the cloaking assembly 10 can be seen clearly with up to 5° misalignment.

The cloaking devices described herein may be used to cloak vehicle articles when viewed from within the vehicle, such as a vehicle A-pillar, B-pillar, C-pillar, D-pillar, etc., and bypass a blind spot caused by the vehicle article. The terms "object" and "article," may interchangeably refer to a visual object or image (2D or 3D) that reflects light or transmits light and the term "light from" may refer to "light reflected from" or "light transmitted from." The terms "generally" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

Although the embodiments disclosed and described in the figures depict a cloaking assembly with a cloaked region bounded by four half Fresnel lenses and two planar reflection boundaries, cloaking assemblies with a cloaked region bounded by two half Fresnel lenses and one planar reflection boundary are provided. For example and without limitation, a cloaked region may be bounded between an object-side half Fresnel lens, a planar reflection boundary and an image-side curved CR boundary.

Directional terms as used herein—for example up, down, right, left, front, back, top, bottom, vertical, horizontal—are made only with reference to the figures as drawn and are not intended to imply absolute orientation unless otherwise expressly stated.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A cloaking device comprising:
   an object-side, an image-side, a cloaked region between the object-side and the image-side, and a reference optical axis extending from the object-side to the image-side;
   an object-side half Fresnel lens and an image-side half Fresnel lens, the object-side half Fresnel lens and the image-side half Fresnel lens each comprising an inward facing surface, an outward facing Fresnel surface, a first end and a second end, wherein the inward facing surface and the outward facing Fresnel surface extend between the first end and the second end;
   a planar reflection boundary positioned between the object-side half Fresnel lens and the image-side half Fresnel lens, the planar reflection boundary comprising an inward facing mirror surface oriented parallel with the reference optical axis; and
   wherein light from an object positioned on the object-side of the cloaking device and obscured by the cloaked region is redirected around the cloaked region by the object-side half Fresnel lens, the planar reflection boundary and the image-side half Fresnel lens to form an image of the object on the image-side of the cloaking device such that the light from the object appears to pass through the cloaked region.

2. The cloaking device of claim 1, wherein the second ends of the object-side and image-side half Fresnel lenses are positioned proximal to the reference optical axis and the first ends of the object-side and image-side half Fresnel lenses are positioned distal to the reference optical axis.

3. The cloaking device of claim 1, wherein the inward facing mirror surface of the planar reflection boundary is positioned at a focal line of the object-side half Fresnel lens.

4. The cloaking device of claim 1, wherein the object-side half Fresnel lens is oriented to focus light from the object positioned on the object-side of the cloaking device onto the inward facing mirror surface of the planar reflection boundary, the inward facing mirror surface of the planar reflection boundary is oriented to reflect light from the object-side half Fresnel lens to the image-side half Fresnel lens, wherein the light reflected from the inward facing mirror surface of the planar reflection boundary is diverging light, and the image-side half Fresnel lens is oriented to focus the diverging light from the inward facing mirror surface of the planar reflection boundary to form the image of the object on the image-side of the cloaking device.

5. The cloaking device of claim 1, wherein light from the object on the object-side of the cloaking device is redirected around the cloaked region via an optical path: object—outward facing Fresnel surface of the object-side half Fresnel lens—inward facing surface of the object-side half Fresnel lens—inward facing mirror surface of the planar reflection boundary—inward facing surface of the image-side half Fresnel lens—outward facing Fresnel surface of the image-side half Fresnel lens—image.

6. The cloaking device of claim 1, wherein:
   the object-side half Fresnel lens comprises a pair of object-side half Fresnel lenses with one of the pair of object-side half Fresnel lenses positioned on a first side of the reference optical axis and another of the pair of object-side half Fresnel lenses positioned on a second side of the reference optical axis opposite the first side;
   the image-side half Fresnel lens comprises a pair of image-side half Fresnel lenses with one of the pair of image-side half Fresnel lenses positioned on the first side of the reference optical axis and another of the pair of image-side half Fresnel lenses positioned on the second side of the reference optical axis;

the planar reflection boundary comprises a pair of planar reflection boundaries with one of the pair of planar reflection boundaries positioned between the object-side half Fresnel lens and the image-side half Fresnel lens positioned on the first side of the reference optical axis and another of the pair of planar reflection boundaries positioned between the object-side half Fresnel lens and the image-side half Fresnel lens positioned on the second side of the reference optical axis; and the light from the object positioned on the object-side of the cloaking device and obscured by the cloaked region is redirected around the cloaked region by the pair of object-side half Fresnel lenses, the pair of planar reflection boundaries and the pair of image-side half Fresnel lenses to form the image of the object on the image-side of the cloaking device such that the light from the object appears to pass through the cloaked region.

7. The cloaking device of claim 6, wherein thicknesses of the first ends of the pair of object-side half Fresnel lenses are equal.

8. The cloaking device of claim 6, wherein thicknesses of the first ends of the pair of object-side half Fresnel lenses are not equal.

9. A cloaking device assembly comprising:
an object-side, an image-side, a cloaked region, a cloaked article positioned within the cloaked region, and a reference optical axis extending from the object-side to the image-side;
a pair of object-side half Fresnel lenses, each of the pair of object-side half Fresnel lenses comprising an inward facing surface and an outward facing Fresnel surface, wherein one of the pair of object-side half Fresnel lenses is positioned on a first side of the reference optical axis and another of the pair of object-side half Fresnel lenses is positioned on a second side of the reference optical axis opposite the first side;
a pair of image-side half Fresnel lenses, each of the pair of image-side half Fresnel lenses comprising an inward facing surface and an outward facing Fresnel surface, wherein one of the pair of image-side half Fresnel lenses is positioned on the first side of the reference optical axis and another of the pair of image-side half Fresnel lenses is positioned on the second side of the reference optical axis; and
a pair of planar reflection boundaries, each of the pair of planar reflection boundaries comprising an inward facing mirror surface oriented parallel to the reference optical axis, wherein one of the pair of planar reflection boundaries is positioned between the object-side half Fresnel lens and the image-side half Fresnel lens positioned on the first side of the reference optical axis and another of the pair of planar reflection boundaries is positioned between the object-side half Fresnel lens and the image-side half Fresnel lens positioned on the second side of the reference optical axis;
wherein light from an object positioned on the object-side of the cloaking device assembly and obscured by the cloaked region is redirected around the cloaked article by the pair of object-side half Fresnel lenses, the pair of planar reflection boundaries and the pair of image-side half Fresnel lenses to form an image of the object on the image-side of the cloaking device assembly such that the light from the object appears to pass through the cloaked article.

10. The cloaking device assembly of claim 9, wherein each of the pair of object-side half Fresnel lenses and each of the pair of image-side half Fresnel lenses comprise a first end and a second end, wherein the inward facing surface and the outward facing Fresnel surface of each of the pair of object-side half Fresnel lenses and each of the pair of image-side half Fresnel lenses extend between the first end and the second end.

11. The cloaking device assembly of claim 10, wherein the second end of each of the pair of object-side half Fresnel lenses and each of the pair of image-side half Fresnel lenses is positioned proximal to the reference optical axis and each of the first ends is positioned distal to the reference optical axis.

12. The cloaking device assembly claim 10, wherein thicknesses of the first end of each of the pair of object-side half Fresnel lenses are equal and thicknesses of the first end of each of the pair of image-side half Fresnel lenses are equal.

13. The cloaking device assembly claim 10, wherein thicknesses of the first end of each of the pair of object-side half Fresnel lenses are not equal and thicknesses of the first end of each of the pair of image-side half Fresnel lenses are not equal.

14. The cloaking device assembly of claim 9, wherein the inward facing mirror surfaces of the pair of planar reflection boundaries are positioned at focal lines of the pair of object-side half Fresnel lenses.

15. The cloaking device assembly of claim 9, wherein the light from the object positioned on the object-side of the cloaking device propagates to the image-side to form the image via an optical path: object—outward facing Fresnel surfaces of the pair of object-side half Fresnel lenses—inward facing surfaces of the pair of object-side half Fresnel lenses—inward facing mirror surfaces of the pair of planar reflection boundaries—inward facing surfaces of the pair of image-side half Fresnel lenses—outward facing Fresnel surfaces of the pair of image-side half Fresnel lenses—image.

16. A vehicle comprising:
an A-pillar; and
a cloaking device positioned on the A-pillar, the cloaking device comprising:
an object-side, an image-side, a cloaked region and a reference optical axis extending from the object-side to the image-side, wherein the A-pillar is positioned within the cloaked region, the object-side is positioned on an exterior of the vehicle and the image-side is positioned within an interior of the vehicle;
an object-side half Fresnel lens and an image-side half Fresnel lens, the object-side half Fresnel lens and the image-side half Fresnel lens each comprising an inward facing surface, an outward facing Fresnel surface, a first end and a second end, wherein the inward facing surface and the outward facing Fresnel surface extend between the first end and the second end; and
a planar reflection boundary positioned between the object-side half Fresnel lens and the image-side half Fresnel lens, the planar reflection boundary comprising an inward facing mirror surface oriented parallel with the reference optical axis,
wherein light from an object positioned on the object-side of the cloaking device and obscured by the cloaked region is redirected around the A-pillar via propagation of the light through the object-side half Fresnel lens onto the planar reflection boundary, reflection of the light from the object-side half Fresnel lens by the planar reflection boundary onto the image-side half Fresnel lens and propagation of the light from the planar reflection boundary through the image-side half Fresnel lens to form an image of the object on the image-side of the cloaking device such that the light from the object appears to pass through the cloaked region.

17. The vehicle of claim 16, wherein the second ends of the object-side and image-side half Fresnel lenses are positioned proximal to the reference optical axis and the first ends of the object-side and image-side half Fresnel lenses are positioned distal to the reference optical axis.

18. The vehicle of claim 16, wherein the inward facing mirror surface of the planar reflection boundary is positioned at a focal line of the object-side half Fresnel lens.

19. The vehicle of claim 16, wherein a thickness of the first end of the object-side half Fresnel lens is equal to a thickness of the first end of the image-side half Fresnel lens.

20. The vehicle of claim 16, wherein a thickness of the first end of the object-side half Fresnel lens is not equal to a thickness of the first end of the image-side half Fresnel lens.

\* \* \* \* \*